United States Patent Office 3,838,154
Patented Sept. 24, 1974

3,838,154
2,6-DIAMINO-3,5-DINITROPYRIDINES AND DERIVATIVES THEREOF
Arthur H. Gerber, Cleveland, Ohio, assignor to Horizons Incorporated, a Division of Horizons Research Incorporated
No Drawing. Original application Nov. 23, 1970, Ser. No. 92,154, now Patent No. 3,740,410, dated June 19, 1973. Divided and this application Jan. 17, 1973, Ser. No. 324,282
Int. Cl. C07d 31/48
U.S. Cl. 260—294.8 F    4 Claims

ABSTRACT OF THE DISCLOSURE

Processes for the preparation of 2,6-diamino-3,5-dinitropyridine from 2,6-diaminopyridine and catalytic reduction of this dinitropyridine to 2,3,5,6-tetraaminopyridine free base and acid salts thereof, and processes for preparing polymers from said pyridines.

---

This application is a division of Ser. No. 92,154 filed on Nov. 23, 1970 and issued as U.S. Pat. 3,740,410 on June 19, 1973.

NATURE OF THE DISCLOSURE

This invention relates to the preparation of tetrakis [nitrogen-functionally substituted] pyridines and to polymers based on said pyridines. More specifically, it relates to the preparation of 2,6-diamino-3,5-dinitropyridine and its derivatves, as represented by the formula below:

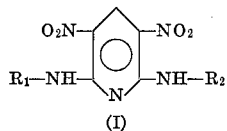

(I)

wherein each of $R_1$ and $R_2$ may represent $$H, -\overset{O}{\underset{\|}{C}}OCH_3, -\overset{O}{\underset{\|}{C}}OC_2H_5, -\overset{O}{\underset{\|}{C}}CH_3, -\overset{O}{\underset{\|}{C}}CF_3, -SO_2CH_3,$$

and similar monovalent groups, and $R_1$ and $R_2$ need not be identical; and to the preparation of 2,3,5,6-tetraaminopyridine whose formula is:

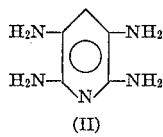

(II)

and of its acid salts.

The diaminodinitropyridines identified by (I) above are convenient precursors to the tetraaminopyridine identified by (II) above. Bis-o-diamines, of which 2,3,5,6-tetraamino-pyridine is one example, have important utilities as monomers for the preparation of polybenzimidazoles, polyimidazopyrrolones (or pyrrones), polybenzimidazobenzophenanthrolines and polyquinoxalines. Polyquinoxalines can be prepared by reaction of bis-o-diamines with either 2,5-dihydroxy-p-benzoquinone or bisglyoxals. Many members of these classes of polymers have outstanding thermal and radiation resistance making them particularly suitable for aerospace applications. Such polymers can often be used to form films and fibers with outstanding chemical and physical properties and are useful in the formulation of protective coatings, in laminating and adhesive formulations, composites, and the like. Polymers derived from 2,3,5,6-tetraaminopyridine show improved thermal stability in air in comparison to benzenoid bis-o-diamine derived polymers.

Recently 2,3,4,6-tetraaminopyridine has been reported in the literature. However, since it is not a bis-o-diamine it is unsuitable for the preparation of the aforementioned polymers. Other areas of utility for bis-o-diamines include pharmaceuticals and hair dyeing.

The 2,3,5,6-tetraaminopyridine free base (II) is susceptible to oxidation and is generally prepared and used as its acid salt. Preferred acids for converting the free base to its acid salt include hydrogen chloride, hydrogen bromide, sulfuric acid, trifluoroacetic acid, trichloroacetic acid, and methanesulfonic acid, but many other acids are suitable as will be readily appreciated by any chemist. The 2,3,5,6-tetraaminopyridine free base is preferably prepared by reduction of 2,6-diamino-3,5-dinitropyridine, the compound (I) in which both $R_1$ and $R_2$ are —H.

The compound 2,6-diamino-3,5-dinitropyridine (i.e. compound I wherein both $R_1$ and $R_2$ are —H) is preferably prepared by direct nitration of 2,6-diaminopyridine. This is in marked contrast to the preparation of the appropriate diaminodinitrobenzene precursors to 1,2,4,5-benzenetetramine which cannot be conveniently prepared in pure form directly from a diaminobenzene. The compound 2,6-diamino-3,5-dinitropyridine can also be prepared from a derivative of 2,6-diaminopyridine by nitration with subsequent hydrolysis. Suitable derivatives of the 2,6-diaminopyridine can be obtained by acetylation, p-nitrobenzoylation, sulfonamide-, or urethane- formation of 2,6-diaminopyridine. Such reactions and derivatives are well known to those skilled in the art, hence will not be discussed in detail.

Dinitro - diaminopyridines of formula (I) in which neither of $R_1$ and $R_2$ is —H, can be converted to 2,3,5,6-tetraaminopyridine by reaction with ammonia (or an ammonia source) or with hot aqueous acid followed by hydrogenation. The former method is preferred. Ammonolysis when $R_1$ or $R_2$ is —$SO_2CH_3$ or

is not desirable, hence acidic hydrolysis is the method of choice. An alternate route, which is less preferable, comprises the reduction of substituted diaminodinitropyridines to a 3,5-diamino-2,6-disubstituted pyridine which can then be hydrolyzed with hot aqueous acid to the tetraaminopyridine. This route is preferred when the amino nitrogen is substituted with

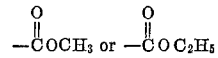

The preferred preparation of 2,6-diamino-3,5-dinitropyridine by the nitration of 2,6-diaminopyridine comprises addition of a nitrating source to a well-stirred solution of the 2,6-diaminopyridine in concentrated sulfuric acid or in a mixture of sulfuric acid and acetic acid. The nitrating source can be, but is not restricted to, 90–100% nitric acid, red fuming nitric acid, sodium or potassium nitrate. The amount of nitrating species can range from the stoichiometric quantity to 100% excess. Temperatures for the nitration can range from —15° C. to 35° C., but are preferably in the —15 to +5° C. range. When the nitration is essentially complete, the product is simply isolated by precipitation into chilled water or other chilled aqueous solvent or by dilution of the nitration mixture. The product obtained by direct nitration of 2,6-diaminopyridine is usually subjected to purification by methods known to those skilled in the art prior to reduction.

Nitration of (I) particularly when $R_1$ and $R_2$ are both selected from

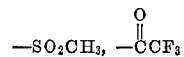

is considerably slower than the case where $R_1$ and $R_2$ are both —H or even the case where $R_1$ and $R_2$ are both

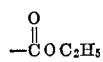

Essentially the same nitration procedure is employed for these less reactive substituents except that higher temperatures are used, preferably 40–80° C.

With respect to the reduction of 2,6-diamino-3,5-dinitropyridine, it is desirable to have high purity dinitro intermediate. Such material is usually obtained by ammonolysis of substituted 2,6-diamino-3,5-dinitropyridines of formula (I), or by rigorous purification of the product from direct nitration of B,F-diaminopyridines.

The reduction can be carried out chemically or catalytically, but the latter is preferred. Chemical agents such as stannous chloride often lead to contamination of product. Catalytic reductions may be performed with platinum, platinum oxide, or palladium catalysts, and the catalysts may be on a support such as charcoal or barium sulfate. The amount of catalyst may vary greatly depending upon solvent and reaction temperatures, but is generally in the range of 0.5 to 10% by weight based on the diaminodinitropyridine, the preferred range being 1–5%. Solvents for the reduction may be inorganic or organic or mixtures thereof. For example, pyridine, alcohol, sulfuric acid in acetic acid, phosphoric acid, phosphoric acid in acetic or formic acid and phosphoric acid in alkanols are all suitable solvents for the redution.

If a non-acidic solvent is used, the tetramine free base can be isolated directly (see Example 8). Suitable non-acidic solvents include lower aliphatic alcohols, methoxyethanol, bis(2-methoxyethyl) ether ("diglyme"), monomethyl ether of diethylene glycol, pyridine, 4-picoline, and others of a similar nature. Organic amines such as pyridine are particularly useful when used as sole solvent or in conjunction with one or more of the aforementioned solvents. Their use leads to an unexpected large increase in reduction rate thus permitting significantly shorter reaction times under a given set of conditions.

If acidic solvents are used, the tetraamine acid salt can be isolated conveniently either admixed with catalyst (Example 6) or as a solution which can then be precipitated by non-solvent containing the appropriate acid (Example 7). For example, reduction in sulfuric acid-acetic acid leads to the sulfuric acid salt of (II) admixed with catalyst. The salt can be freed from catalyst by extraction with water and then precipitated by addition of sulfuric acid. Alternately, the sulfate salt can be dissolved in aqueous hydrochloric acid and the hydrochloride of (II) isolated by saturation with hydrogen chloride. The hydrochloride salt can also be isolated directly from the initial reduction (Example 7).

Other modifications will be apparent to those skilled in the art. Reaction temperatures can vary from 20 to 100° C. and initial hydrogen pressures of 30–1000 p.s.i. can be used. Temperatures of 40–80° C. and hydrogen pressures of 50–200 p.s.i. are preferred.

Since the color and purity of the 2,3,5,6-tetraaminopyridine product are often extremely important, particularly in polymer forming applications, the catalytic method of reduction in acidic media is advantageous in that high purity, light (white to light pink) colored acid salt of the 2,3,5,6-tetraaminopyridine can be directly obtained in good yield.

The following examples are illustrative of preferred embodiments of this invention and are not to be construed as limiting the invention in any way.

EXAMPLE 1

Preparation of 2,6-diamino-3,5-dinitropyridine from 2,6-diaminopyridine

To 250 cc. of concentrated sulfuric acid was added, with chilling and stirring, 54.5 g. (0.5 mole or 1.0 equiv.) of 2,6-diaminopyridine, so that the temperature never rose above 25° C. A solution of 30 cc. sulfuric acid and 76 g. nitric acid [prepared from 47 cc. (75 g.) red fuming nitric acid and 12.9 cc. (18.3 g.) 70% nitric acid] was added to this solution over a two hour period so that the temperature was maintained at 10±5° C. The resulting dark solution was heated to 70° C. over ¾ hour and maintained at 70° C. for ½ hour. The reaction mixture was cooled and poured into 1.5 liter water, stirred well, and filtered. The solid product was washed well and dried to give 63 g. (63% yield). Elemental analysis is confirmatory. Calculated for $C_5H_5N_5O_4$ percent: C, 30.2; H, 2.5; O, 32.2. Found (percent): C, 31.7; H, 2.5 O, 32.3. Major peaks appear in the infrared (KBr) at about 2,9, 3.0, 6.2, 6.9, 7.3, 7.5, 7.8, 8.1, 9.6,, 132 and 14.0$\mu$ Purified product is a golden yellow solid which sinters at about 300° C. and then decomposes at about 355° C.

EXAMPLE 2

Diethyl 2,6-pyridinedicarbamate

Ethyl chloroformate (171 cc., 195 g. or 1.8 mole) was gradually added to a well stirred mixture of 81.7 g. (0.75 mole=1.5 equiv.) 2,6-diaminopyridine, 207 g. (1.5 mole) anhydrous potassium carbonate, and 450 cc. tetrahydrofuran: N,N-dimethylformamide 5:2 v./v. Temperature during addition was 22–40° C. An additional 69 g. carbonate and 50 cc. chloroformate were added and the temperature maintained at 45–50° C. for 1 hour, during which significant carbon dioxide evolution occurred. The mixture was poured into 1 liter of cold water, and then 150 cc. conc. hydrochloric acid added, and the tetrahydrofuran allowed to evaporate from an open dish overnight. Most of the aqua-colored solid present was separated by decantation. The liquor was acidified with hydrochloric acid to pH 7, concentrated to about half volume, and cooled. Product and salts were filtered off and reslurried twice with water and filtered to remove most of the potassium chloride. The product was extracted from residual inorganic salts with 500 cc. of hot acetone. The product was reprecipitated on addition of 750 cc. of water, combined with previously removed colored solid, and slurried with isopropyl alcohol, filtered, and dried to give 42 g. (22%) light aqua solid, m.p. 124–128° C. Recrystallization from 1:1 v./v. ethanol-water raised the m.p. to 130–132° C.

Analysis, calcd. for $C_{11}H_{15}N_3O_4$ (mol. wt. 253) (percent): C, 52.2; H, 5.9; N, 16.6. Found (percent): C, 51.6; H, 5.8; N, 16.5.

The above product can also be obtained in tetrahydrofuran solvent using a tertiary amine (e.g., pyridine, triethylamine) as acid acceptor. Dimethyl 2,6-pyridinedicarbamate is obtained by the use of methyl chloroformate in place of the ethyl chloroformate.

EXAMPLE 3

Diethyl ester of 3,5-dinitro-2,6-pyridinedicarbamic acid, (I) in which both $R_1$ and $R_2$ are

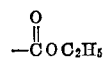

To a solution of 25.3 g. (0.1 mole) diethyl 2,6-pyridinedicarbamate in 125 cc. conc. sulfuric acid at 0–5° C. was added, over 1 hour, a solution of 100% nitric acid (0.4 mole or 100% excess) in acetic acid. The nitrating solution was prepared by gradually adding 14 cc. of acetic anhydride to 19 cc. of fuming 90% nitric acid while maintaining the temperature below 0° C. The nitration was completed by stirring 1 hour at 0–5° C. followed by one hour at 27° C. The reaction solution was poured into ½ liter cold water. The solid product was washed well and dried, yielding 25 g. of dried product. Recrystallization from ethanol gave 21.0 g. (62%), m.p. 160–164° C.

Dimethyl 2,6-pyridinedicarbamate can be similarly nitrated to give (I) in which both $R_1$ and $R_2$ are

EXAMPLE 4

2,6-diamino-3,5-dinitropyridine

To a solution of 9.0 g. diethyl 3,5-dinitro-2,6-pyridinedicarbamate in 30 cc. N,N-dimethylformamide was added 10 cc. of conc ammonia. Within about 5 minutes a massive precipitate formed. Stirring was continued overnight at room temperature. Isopropyl alcohol (50 cc.) was added with good stirring, the product filtered, washed, and dried to give 5.1 g. (97%) yellow solid. Infrared spectra showed no carbonyl absorption. Elemental analysis was as follows: Calcd. for $C_5H_5N_5O_4$ (percent): C, 30.1; H, 2.5; N, 35.1. Found (percent): C, 30.6; H, 2.5; N, 35.7. The infrared spectrum of this product is essentially identical to that from Example 1.

In somewhat similar fashion 2,6-diamino-3,5-dinitropyridine may be obtained from substituted amines (I) in which $R_1$ and $R_2$ are each selected from the group consisting of

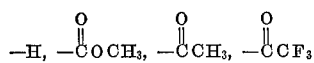

The compounds in which the substituents are

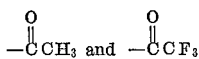

are obtained from 2,6-diaminopyridine by reaction with acetic and trifluoroacetic anhydrides, respectively. Compounds where $R_1$ is hydrogen and $R_2$ is not hydrogen are conveniently prepared by using a large excess of 2,6-diaminopyridine in the initial reaction with the anhydride.

EXAMPLE 5

2,6-diamino-3,5-dinitropyridine by acid hydrolysis

Diethyl 3,5-dinitro-2,6-pyridinedicarbamate (9.5 g.) was dissolved in 48 g. conc. sulfuric acid, 20 cc. water were added and the solution heated 4 hours at 110–115° C. The reaction mixture was cooled and poured into 250 cc. cold water with stirring. The solid precipitate was filtered, washed well, and dried to give a quantitative yield of 2,6-diamino-3,5-dinitropyridine.

EXAMPLE 6

2,3,5,6-tetraaminopyridine bis(sulfuric acid salt)

2,6-diamino-3,5-dinitropyridine (3.75 g. or 0.0188 mole) was partially dissolved in 60 cc. of 30% sulfuric acid in glacial acetic acid in a 250 cc. Parr bottle. It was stirred well with slight application of heat and 2.1 g. of 5% palladium on barium sulfate added. Reduction with hydrogen was complete (uptake of 9.0 lbs. hydrogen, theoretical is 7.7 lbs. excluding adsorption on catalyst) at ambient temperature within 2 hours. The resulting off-white mixture was diluted with acetic acid and tetrahydrofuran, solids filtered, washed, and dried to give 8.5 g. light grey solid. Of this weight, 2.1 g. was catalyst and very little could be inorganic salt as no precipitate was obtained from the filtrate on addition of ether. The yield of tetraamine bis (sulfuric acid salt) was 6.4 g. (100%). The latter was extracted with 50 cc. of water pre-boiled under nitrogen. Rapid darkening of the liquor was noted. A small amount of dark insoluble solid was filtered off and 13 g. conc. sulfuric acid added to the filtrate to precipitate product. The latter was washed successively with 25% sulfuric acid, acetic acid, and alcohol to give, after drying, 1.2 g. of rust-colored solid. Alcohol washing (2×) and drying of the insolubles led to reclaiming of 5.2 g. dark solid. Elemental analysis of the 1.2 g. material confirmed the tetramine di(sulfuric acid salt) structure assignment. Calculated for $C_5H_9H_5 \cdot 2H_2OSO_4$ (mol. wt.=335) (percent): C, 17.9; H, 3.9; N, 20.9; S, 19.1; O, 38.2. Found (percent): C, 17.8; H, 4.9; N, 20.4; S, 19.0; O, 37.9 (by difference).

The sulfate salt-catalyst mixture can be freed from catalyst and converted to the trihydrochloride as follows: The solid mixture (17 g.) was stirred well with 100 cc. of 5% hydrochloric acid which had been blown with nitrogen at reflux, filtered hot, cooled and saturated with hydrogen chloride. The purple solid was filtered, washed with alcoholic hydrogen chloride, and vacuum dried to yield 5.8 g. tetraaminopyridine trihydrochloride monohydrate. Calculated for $C_5H_9N_5 \cdot 3HCl \cdot H_2O$: C, 22.5; H, 5.2; N, 26.2; Cl, 39.9. Found: C, 22.5; H, 5.3; N, 26.5; Cl, 40.2.

In somewhat similar manner using hydrogen bromide the hydrobromide salt is obtained.

EXAMPLE 7

To a well stirred solution at about $-10°$ C., of 54.5 g. (0.5 mol=1.0 equiv.) of 2,6-diaminopyridine in 300 cc. pyridine was added 115 g. (1.0 mol) methanesulfonyl chloride. After ½ hour at this temperature, the dark solution was allowed to warm up to room temperature and kept at this temperature for 1½ hours. Product and hydrochloride salts were precipitated by addition of tetrahydrofuran and washing with tetrahydrofuran (total volume about 1 liter). The insoluble gum was diluted with 250 cc. water and neutralized with conc ammonia. Water was largely removed from the mixture by rotary evacuation and the wet solid extracted with ½ liter of warm ethanol. The ethanolic liquor was concentrated to 200 cc., cooled to $-20°$ C. and crude product (24 g.) filtered off. Removal of inorganic salt and recrystallization from aqueous ethanol gave 2,6-pyridinedimethanesulfonamide, m.p. 190–194° C. Elemental analysis, calculated for $C_7H_{11}N_3O_4S_2$ (M.W. 265): N, 15.9; S, 24.2. Found: N, 15.9; S, 23.9.

5.0 g. (0.019 mol) of the above 2,6-pyridinedimethanesulfonamide was dissolved in 20 cc. conc sulfuric acid and a premixed solution of 4 cc. 90% nitric acid (100% mole excess) and 3 cc. acetic anhydride was added so that the reaction temperature was maintained in the range 20–28° C. The reaction was stirred at room temperature for 1 hour during which it became heterogeneous. Additional sulfuric acid (5 cc.) was added and the mixture heated at 50–55° C. for 1 hour. After cooling to room temperature, it was poured with stirring on 53 g. ice. The yellow solid product was filtered, washed, reslurried with isopropyl alcohol, refiltered and dried to give 4.7 g. (70%), m.p. 275–285° C. This material was dissolved in 15 cc. N,N-dimethylacetamide at 80° C. and then boiling isopropyl alcohol added to initiate precipitation. The mixture was cooled to ice temperature, solid filtered off and dried to give 3.0 g. m.p. 282–286° C. Elemental analysis, calculated from $C_7H_9N_5O_8S_2$ (mol. wt. 355): N, 19.7; S, 18.0. Found: N, 19.4; S, 18.0.

EXAMPLE 8

The monomethanesulfonamide of 2,6-diaminopyridine can be obtained in a reaction similar to that of Example 7 using excess 2,6-diaminopyridine (54.4 g.=1.0 equiv.), 100 cc. pyridine plus 200 cc. tetrahydrofuran as solvent and 22.9 g. (0.2 mol) methanesulfonyl chloride. The product is isolated by removing tetrahydrofuran and pyridine, neutralizing the residue and removing excess 2,6-diaminopyridine.

The above product upon reaction with ethyl chloroformate or acetic anhydride (or acetyl chloride); and subsequent nitration affords (I) in which $R_1$ is $-SO_2CH_3$ and $R_2$ is

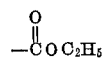

and in which $R_1$ is —$SO_2CH_3$ and $R_2$ is

respectively.

EXAMPLE 9

Heterocyclic polymer from 2,3,5,6-tetraaminopyridine and 1,4,5,8-naphthalenetetracarboxylic acid To a 500 cc. 3-necked flask fitted with a Trubore stirrer and nitrogen inlet was added 333 g. 116% polyphosphoric acid. The polyphosphoric acid was deoxygenated by heating overnight at 110° C. with nitrogen bubbling through the stirred acid. Then, at 75° C., was added 3.32 g. (0.0133 mole) of 2,3,5,6-tetraaminopyridine trihydrochloride and the solution heated at 75–80° C. overnight under nitrogen to expel hydrogen chloride. To this solution was added 4.05 g. (0.0133 mole) 1,4,5,8-naphthalenetetracarboxylic acid and the mixture slowly heated to 180° C. and maintained at that temperature for 10 hours. The hot viscous solution was slowly poured with good stirring into 1.5 liter of pre-chilled (ca. —20° C.) methanol. The polymer was washed well with methanol and then dried at 190–200° C. under reduced pressure to yield 3.4 g. (76%) dark solid. The polymer was further purified by dissolving 2 g. in 50 cc. of methanesulfonic acid and reprecipitating into methanol. The precipitate was washed well with methanol and then methanol containing ammonia and water and finally dried 6 hours at 230–250° C. at 0.05–0.1 mm. mercury to afford 1.5 g. of product (75% recovery). Analysis, calculated for $C_{19}H_5N_5O_2$ (equiv. wt. 335): C, 68.0; H, 1.5; N, 20.9. Found: C, 66.2; H, 2.2; N, 19.3; Ash, 0.3.

The extreme thermal stability of this polymer is illustrated by the following experiment. The polymer (0.12 g.) was placed in an open 10 cc. porcelain crucible and heated with a burner (flame temperature immediately below the crucible was 1000–1100° C.). It took over 2 hours for complete (98%) combustion to occur.

Essentially the same polymer is obtained by replacing the naphthalenetetracarboxylic acid with an equivalent amount of 1,4,5,8-naphthalenetetracarboxylic acid dianhydride in the initial polymerization. The resulting product also exhibited good thermal stability.

I claim:

1. A derivative of 2,6-diamino-3,5-dinitropyridine represented by the general formula

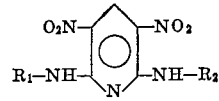

wherein each of $R_1$ and $R_2$ is selected from the group consisting of H;

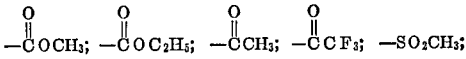

and not more than one of $R_1$ and $R_2$ being H.

2. 2,6-diamino-3,5-dinitropyridine.

3. A derivative of 2,6-diamino-3,5-dinitropyridine of claim 1 in which $R_1$ and $R_2$ are alike and neither is H.

4. A derivative of 2,6-diamino-3,5-dinitropyridine of claim 1 in which one of $R_1$ and $R_2$ is H.

References Cited

Klingsberg, Pyridine and Its Derivatives, Part Two, Interscience Publishers, pp. 471–475 (1961).

Roberts et al., Basic Principles of Organic Chemistry, Benjamin Publishers, pp. 531, 563, 664, 665 (1965).

Klingsberg, Pyridine and Its Derivatives, Part One, Interscience Publishers, pp. 17–19 (1960).

ALAN L. ROTMAN, Primary Examiner

U.S. Cl. X.R.

260—295 CA, 295 AM, 296, 47 CP, 65, 78TF